United States Patent [19]

Brandenstein et al.

[11] Patent Number: 4,605,321

[45] Date of Patent: Aug. 12, 1986

[54] ROLLER BEARING FOR SEATING A PEDAL BEARING SHAFT

[75] Inventors: Manfred Brandenstein, Eussenheim; Roland Haas, Hofheim; Rüdiger Hans, Niederwerrn, all of Fed. Rep. of Germany

[73] Assignee: SKF Kugellagerfbriken GmbH, Schweinfurt, Fed. Rep. of Germany

[21] Appl. No.: 584,090

[22] Filed: Feb. 27, 1984

[30] Foreign Application Priority Data

Mar. 23, 1983 [DE] Fed. Rep. of Germany ... 8308615[U]

[51] Int. Cl.⁴ ............................................. F16C 23/06
[52] U.S. Cl. .................................. 384/512; 384/515; 384/519; 384/545; 384/458
[58] Field of Search ............... 384/512, 515, 519, 545, 384/538, 458

[56] References Cited

U.S. PATENT DOCUMENTS

| 574,713 | 1/1897 | Copeland | 384/545 |
| 1,457,954 | 6/1923 | Batcheller | 384/538 |
| 1,583,562 | 5/1926 | Stenner | 384/538 |

Primary Examiner—Lenard A. Footland
Attorney, Agent, or Firm—Yuter, Rosen & Dainow

[57] ABSTRACT

A rolling bearing unit with a pair of axially spaced grooves in the shaft, rolling bearing elements in the grooves, sheet metal outer race elements secured in a housing, and an adjusting ring for driving one of the outer race elements axially relative to the housing and to the other race element.

10 Claims, 2 Drawing Figures

ROLLER BEARING FOR SEATING A PEDAL BEARING SHAFT

BACKGROUND OF THE INVENTION

This invention is in the field of rolling bearings, in particular a bearing with adjustment for the seating and play of the bearing on a pedal bearing shaft which includes two outer rings fixed in a housing bore and two rows of balls arranged in grooves on the shaft.

Such a bearing for pedal bearing shafts is disclosed in, for example, the prior art West German Pat. No. OS 21 42 954. This bearing consists of a series of complicated individual parts, the manufacture of which is relatively expensive. In addition, assembly of this bearing is cumbersome and time-consuming and may be done by automatic equipment only with difficulty.

It is therefore an objective of the present invention to provide a roller bearing unit of the type mentioned above which consists of parts inexpensive to manufacture, is supplied as a unit by the manufacturer, and may be assembled using automatic equipment.

SUMMARY OF THE INVENTION

The objective noted above is accomplished in a rolling bearing unit of the aforementioned type in that the two outer rings consist of two cup or pot-shaped parts of sheet metal with flanges directed radially inward, one of the outer rings being fixed in the housing bore by a split retaining ring, and the other outer ring being axially adjustable by means for adjusting the bearing play, which means have tapered surfaces on the sides turned toward the parts to be attached.

According to one preferred embodiment of the invention, the split retaining ring is inserted in an annular groove on the surface of one of the outer rings and rests on a tapered bore surface of the housing. The other outer ring in this embodiment is provided on the surface with a threaded section on which is arranged an adjusting ring, a tapered surface of which engages a tapered bore surface of the housing. It is easy to see that this design of the bearing parts permits inexpensive manufacture and easier assembly of the bearing by efficient automatic equipment.

According to another preferred embodiment, the split retaining ring is arranged in an annular groove of the housing and rests on the rounded-off surface of one of the outer rings. Inserted in the threaded bore of the housing is an adjusting ring, a tapered bore surface of which engages the rounded-off surface of the other outer ring. This results in a design requiring still less accurately worked surfaces and hence is still less expensive to manufacture.

The invention is described in greater detail below by reference to two embodiments represented schematically in the drawings attached hereto.

DETAILED DESCRIPTION OF THE PREFERRED EMBODIMENT

Figure 1:
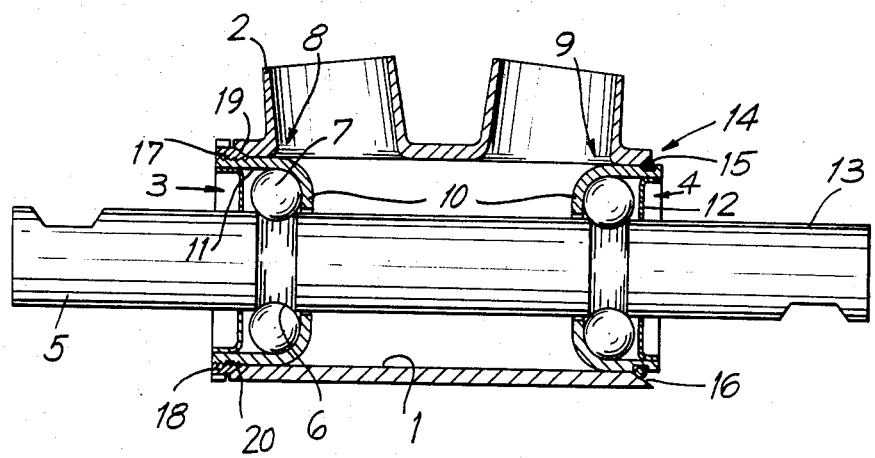
FIG. 1 is an axial section view showing a first embodiment of a pedal bearing unit with adjustable play.

In the bore 1 of a housing 2, represented schematically in FIG. 1, are inserted, in an O arrangement, two inclined ball bearings 3 and 4, which serve for seating a pedal bearing shaft 5. The pedal bearing shaft 5 has an essentially constant diameter and two grooved races 6 for the rolling elements 7. The outer rings 8 and 9 made of thin-walled sheet metal, are cup or pot-shaped, while the flanges 10, directed radially inward, confront one another and extend to near the pedal bearing shaft 5. In the shoulders 11 of the outer rings 8 and 9, sealing disks 12, having an L-shaped cross section, are provided the radially extended arm of each of which reaches, except for a clearance, to the surface 13 of the pedal bearing shaft 5. A split ring 14, with O-shaped cross section, which is inserted in an annular groove 15 on the surface of the outer ring 9 and rests on a tapered bore surface 16 of the housing 2, serves for axial fixation of the inclined ball bearing 4 (on the right-hand side of the drawing). On the surface of the outer ring 8 (on the left-hand side of the drawing), a threaded section 17 is provided, on which is screwed an adusting ring 18, a tapered surface 19 of which engages in a corresponding bore surface 20 of the housing 2. The adjustment of bearing play is made by the adjusting ring 18, which when screwed on the outer ring 8 is supported against the tapered bore surface 20 of the housing 2 and draws the outer ring 8 outward. At the same time the flange 10, directed radially inward, of the outer ring 8 extends behind the rolling elements 7 and shifts the latter with the shaft 5 to the left until the desired bearing play is obtained.

Figure 2:
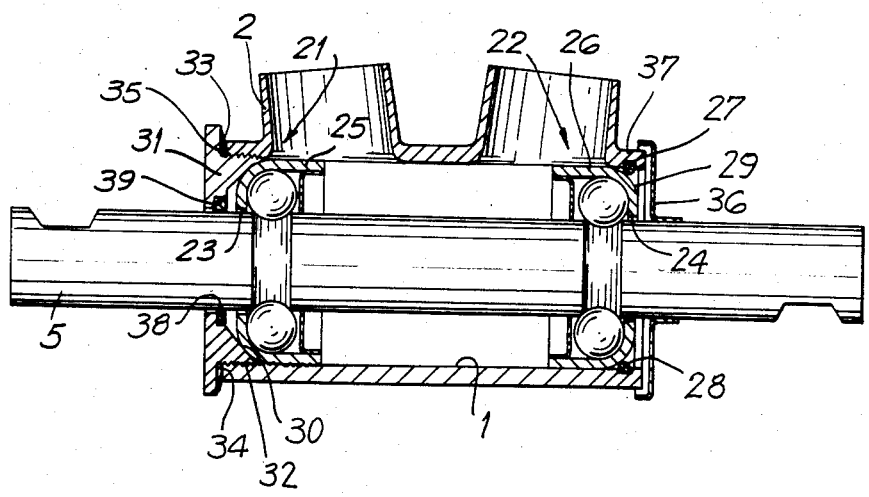
FIG. 2 is a similar view showing a second embodiment of a pedal bearing unit with adjustable play.

The pedal bearing unit shown in FIG. 2 consists of two similarly designed inclined ball bearings 21 and 22, which are inserted in the housing bore 1 in an X arrangement, so that the flanges 23 and 24 which extend drawn radially inward of the outer rings 25 and 26, are turned away from each other. Axial fixation of the right-hand outer ring 26 is likewise obtained by a split O-shaped ring 27 which engages an annular groove 28 in the bore 1 of the housing 2 and inwardly abruts the rounded-off section 29 of the outer ring 26. The adjustment of the bearing play is effected by an adjusting ring 31, which is provided with a tapered bore surface 30 and abuts the rounded-off surface 32 of the outer ring 25. When the adjusting ring 31 is screwed in, the left-hand bearing 21 and the pedal bearing shaft 5 are shifted to the right and the bearing play is thereby adjusted. The adjusting ring 31 is secured against turning by a plate spring 33, which is supported against the face 34 of the housing 2 and against the lateral surface 35 of the adjusting ring 31. The rolling bearing unit is sealed off on one side by a disk 36 arranged on the pedal bearing shaft 5, which disk encloses the outer housing section 37 with clearance. On the other side, a sealing ring 38 is arranged in a recess 39 formed in the adjusting ring 31 and rests on the pedal bearing shaft 5.

In the embodiments described, good centering of the bearing parts and bracing of the outer rings 8, 9 and 25, 26 by the housing 2 are obtained by, for example, cooperation of the tapered surfaces 19 and 20 and cooperation of the tapered surface 30 and rounded surface 32, respectively.

The embodiments described represent merely examples of a rolling bearing unit pursuant to the invention. Variations in the design of the individual components are of course possible within the scope of the invention.

What is claim is:

1. In a rolling bearing unit including a housing element with a bore therethrough, a pedal bearing shaft extending through said bore, and a pair of axially spaced bearings formed by a pair of axially spaced annular grooves in the outer surface of said shaft, a plurality of bearing elements positioned in said grooves and first and second outer race elements mounted in said housing bore, the improvement wherein each of said outer race elements is made of sheet metal, is generally cup-shaped to define generally cylindrical walls, and has a flange at one end extending radially inward, and said rolling bearing unit further comprises first means mounted to inhibit axial movement of said first outer race element in said bore in one axial direction at an axial position along said bore, whereby said first and second outer race elements may pass freely through said bore in said one axial direction until said first outer race element is at said axial position, and second means for adjusting the axial position of said second outer race element with respect to said bore to enable adjustment of the axial play of said bearing with respect to said shaft, wherein said second means comprises a ring with external threads, rotation of said ring driving said ring and said second outer race element axially relative to said housing.

2. In a rolling bearing unit including a housing element with a bore therethough, a pedal bearing shaft extending through said bore, and a pair of axially spaced bearings formed by a pair of axially spaced annular grooves in the outer surface of said shaft, a plurality of bearing elements positioned in said grooves and first and second outer race elements mounted in said housing bore; the improvement wherein each of said outer race elements is a sheet meatal element, is generally cup-shaped to define generally cylindrical walls, and has a flange at one end extending radially inward, and said rolling bearing unit further comprises first means mounted to inhibit axial movement of said first outer race element in said bore, and second means for adjusting the axial position of said second outer race element with respect to said bore to enable adjustment of the axial play of said bearing with respect to said shaft, said second means comprising an adjustment member adjustably coupled to said second outer race element and having a tapered surface engaging said housing.

3. Apparatus according to claim 2 wherein said first outer race element defines an annular groove in its outer surface and said first means comprises a split ring secured in said annular groove and engaging said housing bore, and said second means is adjustably coupled to said second outer race element and has a tapered annular surface engaging an annular edge of said bore for driving said second outer race element axially relative to said bore.

4. Apparatus according to claim 3 wherein said second means comprises a ring with internal threads, and said second outer race element has mating threads on its outer surface, whereby rotation of said ring with internal threads drives said second outer race element and shaft axially relative to said housing bore.

5. Apparatus according to claim 3 wherein said split ring engages a tapered annular edge of said bore.

6. Apparatus according to claim 3 wherein said pair of outer race elements has their cylindrical parts directed toward each other and their radial flanges at adjacent ends of said cylindrical parts.

7. In a rolling bearing unit including a housing element with a bore therethrough, a pedal bearing shaft extending through said bore, and a pair of axially spaced bearings formed by a pair of axially spaced annular grooves in the outer surface of said shaft, a plurality of bearing elements positioned in said grooves and first and second outer race elements mounted in said housing bore, the improvement wherein each of said outer race elements is made of sheet metal, is generally cup-shaped to define generally cylindrical walls, and has a flange at one end extending radially inward, and said rolling bearing unit further comprises first means mounted to inhibit axial movement of said first outer race element in said bore in one axial direction at an axial position along said bore, whereby said first and second outer race elements may pass freely through said bore in said one axial direction until said first outer race element is at said axial position, and second means for adjusting the axial position of said second outer race element with respect to said bore to enable adjustment of the axial play of said bearing with respect to said shaft, wherein said first means is a split ring and said second means has a tapered surface engaging one of said second outer race element and said housing bore for relatively axially displacing said housing and said second outer race element.

8. Apparatus according to claim 7 wherein said second means comprises and adjustment member adjustably coupled to said housing and having a tapered surface engaging one of said outer race elements.

9. Apparatus according to claim 8 wherein said housing bore defines an annular groove and said first means comprises a split ring secured in said groove and engaging an outer surface of said first outer race element, and said second means is adjustably coupled to said bore and has a tapered surface engaging an outer surface of said second outer race element for driving same axially relative to said bore.

10. Apparatus according to claim 9 wherein said pair of outer race elements has their cylindrical parts directed toward each other and their radial flanges at remote opposite ends of said cylindrical parts.

* * * * *

UNITED STATES PATENT AND TRADEMARK OFFICE
CERTIFICATE OF CORRECTION

PATENT NO. : 4,605,321

DATED : August 12, 1986

INVENTOR(S) : Manfred Brandenstein, et al.

It is certified that error appears in the above-identified patent and that said Letters Patent is hereby corrected as shown below:

Column 2, line 7, omit "to";

line 21, omit "in";

line 21, after "corresponding" insert --tapered--.

Column 4, line 38, change "and" to --an--.

Signed and Sealed this

Twenty-fourth Day of October, 1989

Attest:

DONALD J. QUIGG

Attesting Officer

Commissioner of Patents and Trademarks